Patented Dec. 20, 1932

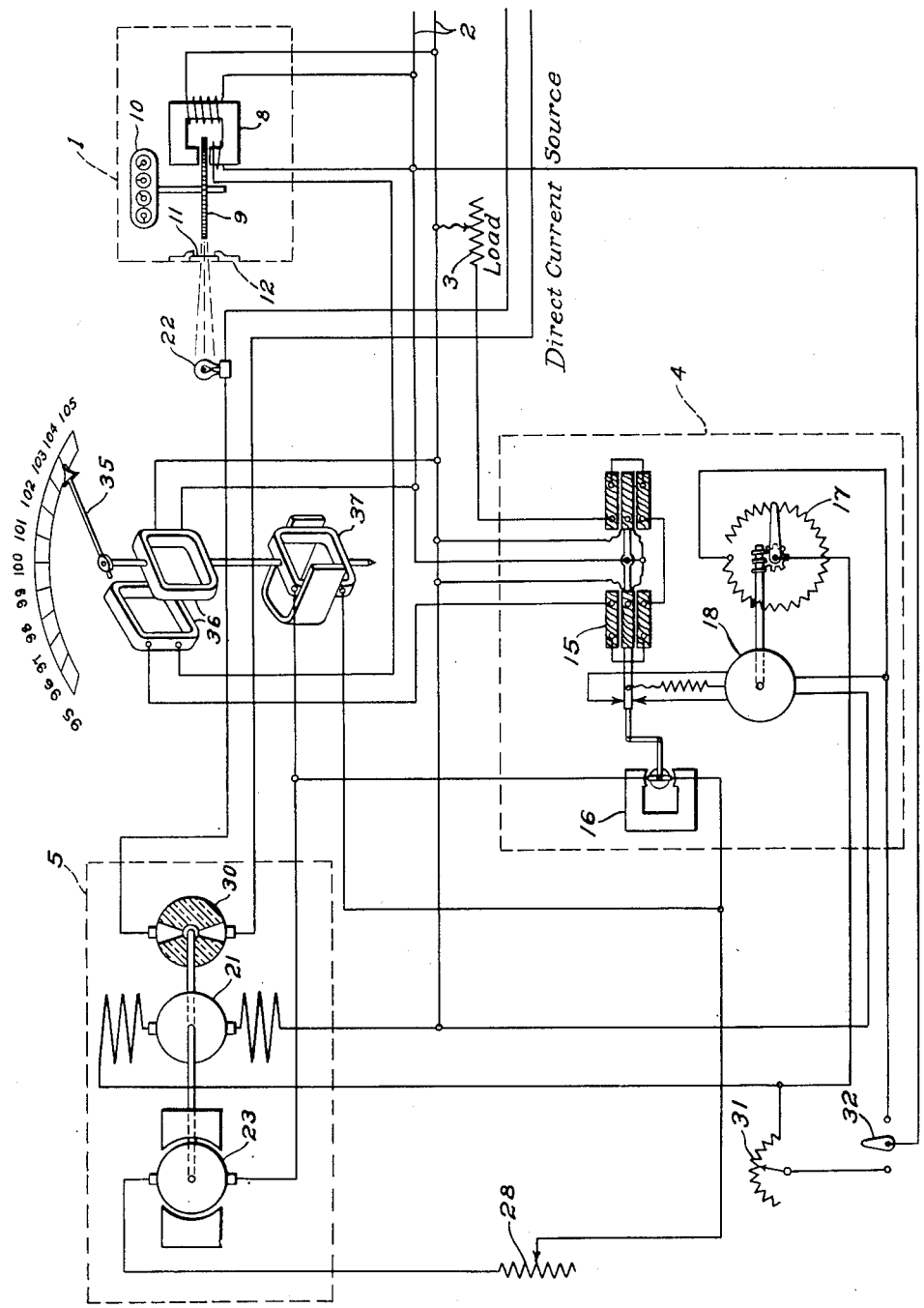

1,891,735

UNITED STATES PATENT OFFICE

HARRY P. SPARKES, OF WEST ORANGE, NEW JERSEY, ASSIGNOR TO WESTINGHOUSE ELECTRIC & MANUFACTURING COMPANY, A CORPORATION OF PENNSYLVANIA

METHOD OF AND APPARATUS FOR CALIBRATING ELECTRIC INSTRUMENTS

Original application filed September 16, 1926, Serial No. 135,981. Divided and this application filed April 27, 1929. Serial No. 358,619. Renewed May 27, 1932.

My invention relates to a method of, and apparatus for, calibrating electrical integrating meters.

My invention is disclosed in my copending application for Letters Patent, Serial No. 135,981, filed September 16, 1926, for improvement in method and apparatus for calibrating electrical instruments, of which the present application is a division.

An object of my invention is to provide a method of calibrating watthour meters which shall be adapted for use either in the factory or after the meters have been installed on a customer's premises.

A further object of my invention is to provide calibrating apparatus embodying means for indicating directly any error which may exist in the instrument being calibrated. For example, the indicating means embodying my invention may be calibrated to show any percentage error which may exist in the registration of the instrument being tested.

These and other advantages of my invention will appear more clearly from a consideration of the following detailed description of apparatus embodying the invention.

In accordance with my invention, the rotatable element of an integrating meter to be tested is provided with equally spaced marks or indicia for cooperation with my stroboscopic device. Preferably, the edge of the disc armature of the meter is employed for this purpose because this edge is visible through the cover of the instrument and, consequently, permits the calibration of the instrument without removing the cover thereof. Lines may be painted on the edge of the disc or the edge of the disc may be scored or ruled in a milling machine or ruling engine.

If lines are painted on the disc, the lines should preferably be of a color which is materially different from the color of the armature disc, although any color may be employed in connection with a color filter in the optical system to be described.

The stroboscopic calibrating apparatus comprises a light source controlled in accordance with the correct speed of rotation of the integrating instrument in such manner that the lines or indicia on the armature member will appear stationary at some predetermined speed. For example, a motor-driven commutator for controlling a gas-filled high-speed signaling lamp, may be employed. In order to compensate for variations in circuit conditions, such as variations in the potential of the supply circuit, suitable regulating means is employed between the circuit and the stroboscopic device.

In the calibration of instruments in the factory, it is desirable to adjust the respective instruments to a standard before the instruments are sold. However, after the instruments have been installed in service, it is sometimes desirable to determine the degree of accuracy of the instruments before correcting the adjustment thereof.

In accordance with the present invention, the last mentioned result is accomplished by the provision of an indicating device which indicates the degree of accuracy of the instrument being tested when the speed of the stroboscopic device has been adjusted to correspond to the speed of the watthour meter. The indicating device preferably comprises a watt-meter element connected in circuit relation with the watthour meter to be tested and mechanically coupled to a volt-meter element electrically associated with the stroboscopic device.

The single figure of the accompanying drawing is a diagrammatic view of a calibrating apparatus for a watthour meter constructed in accordance with my invention, which figure corresponds to Fig. 2 of sheet 2 of the application of which the present application is a division.

Referring to the drawing, the calibrating apparatus illustrated is adapted for use in the factory-testing of a large number of instruments which must be calibrated properly before being sold, or to determine the degree of accuracy of the instruments before correcting the adjustment thereof after they have been installed in service.

A watthour meter 1 is connected to a supply circuit 2, a load 3 being connected to the circuit 2 through the windings of the watthour meter 1 winding 36 of the indicating instrument and the windings of a regulating device 4 associated therewith. Stroboscopic calibrating apparatus 5 is also associated with the watthour meter 1 and is controlled by the regulator 4.

The watthour meter 1 comprises an electromagnet 8, an armature member 9 controlled thereby and a register 10 driven by the armature member 9. The edge of the armature member 9 has evenly spaced marks or indicia thereon which are visible through a window 11 in the cover member 12 of the instrument.

The regulator 4 comprises a Kelvin-balance type watt-meter 15 in series relation to the watthour meter 1, a d'Arsonval voltmeter 16 mechanically connected to the movable arm of the Kelvin balance 15 and a variable resistor 17 controlled by pilot motor 18 in accordance with the relative torques on the instruments 15 and 16.

The stroboscopic device 5 comprises a driving motor 21, a tachometer generator 23 and a commutator 30, all disposed on the shaft of the motor 21, the commutator 30 being adapted to interrupt the current to a light source 22 in accordance with the speed of rotation of the motor 21.

In order to take care of the rapid interruptions in current through it, the light source 22 is preferably a lamp having an incandescent filament of such character that it is heated and cooled rapidly as the current therethrough varies, such as a neon gas-filled lamp.

The driving motor 21 of the stroboscopic device 5 is connected, through the variable resistor 17 of the regulator 4, to the circuit 2. The terminals of the tachometer generator 23 are connected to the terminals of the volt-meter 16, a calibrating resistor 28 being provided in this circuit.

The armature member 9 of the watthour meter 1 rotates at a perdetermined speed, depending upon the adjustment of the meter and the magnitude of the load 3. If the adjustment of the meter is correct, its speed corresponds to the speed of the stroboscopic device 5 so that the marks on the armature disc 9 of the watthour meter appear to an observer to remain stationary. This is the well-known stroboscopic effect, and it is believed that the operation will be clear without a detailed explanation of the phenomenon.

If the adjustment of the watthour meter 1 is incorrect, the armature does not appear stationary, and the instrument is adjusted until the desired speed of rotation is obtained: If a large number of equi-distant marks on the armature member 9 be employed, the instrument may be easily and quickly adjusted with a high degree of accuracy.

Ordinarily, variations in the potential of the supply circuit 2 are sufficient to disturb the testing operation when a special source of constant potential is not used, and, consequently, the regulator 4 is provided to compensate for these variations. If the voltage of the circuit should increase, the load 3 would consume more energy and the instruments 1 and 5 would both have increased torque. If the increase in voltage of the supply circuit 2 does not increase the speed of the driving motor 21 at the same rate as the speed of the watthour meter 1, the Kelvin balance watt-meter 15 overcomes the torque of the volt-meter 16 and varies the resistor 17 by means of the pilot motor 18 until the speed of the driving motor 21 reaches the desired value. Consequently, variations in the potential of the supply circuit do not affect the calibrating operation, and it is unnecessary to employ a supply circuit of absolutely constant voltage, as has heretofore been necessary.

In the present embodiment of my invention, direct indication is obtained of the degree of accuracy of the watt-meter on the test. For example, the watt-meter 1 may be one that has been installed upon a customer's premises for a considerable period and it may be desirable to check its accuracy before an attempt is made to correct the adjustment of the meter.

In this embodiment, while the commutator 30 is used to interrupt the current to the lamp 22, it will be apparent to those skilled in the art that this arrangement is equivalent to the light shutter shown in Fig. 1 of the parent application.

A manually adjustable resistor 31 is provided in the circuit of the driving motor 21, and a change-over switch 32 is also provided to permit the driving motor to be controlled either by the regulator resistor 17 or the last mentioned resistor 31. In some cases, the regulating apparatus 4 may be omitted, and the regulation of the driving motor 21 accomplished solely by means of the adjustable resistor 31.

An indicating device 35 is so connected to the watthour meter 1 and to the tachometer 23 as to indicate directly the degree of accuracy of the watt-hour meter when the stroboscopic apparatus has been adjusted to correspond to the registration of the watthour meter 1.

The indicating device 35 comprises a watt-meter 36 of the electro-dynamic type, mechanically coupled to a volt-meter 37 of the d'Arsonval type. The watt-meter 36 is so connected in series with the watthour meter 1 that it will be energized in accordance with the magnitude of the load 3 connected to the watthour meter 1. The volt-meter 37 is so connected to the tachometer generator 23 that it is energized in accordance with the speed of rotation of the driving motor 21 of the stroboscopic apparatus. The driving motor 21 is adjusted by means of the variable resistor 31 until the speed of the stroboscopic apparatus corresponds to the registration of the watthour meter 1. If the watthour meter 1 is in correct adjustment, the torque of the watt-meter 36 exactly balances the torque of the volt-meter 37, and the pointer of the indicating device 35 indicates the accuracy of the instrument under test to be 100%.

If the watthour meter 1 has an error, the necessary adjustment of the stroboscopic apparatus 5 alters the speed of the tachometer 23, and the volt-meter 37 has a greater or less torque than that of the watt-meter 36. Consequently, the pointer of the indicating device 35 indicates that the watt-hour meter 1 has a positive or a negative error. The scale of the indicating device 35 is preferably calibrated to indicate the percentage error, as indicated.

The apparatus heretofore described is preferably disposed in a portable carrying case to facilitate the testing of the instruments installed on customer's premises. In such case, the automatic regulating apparatus 4 may be omitted, and the speed of the driving motor 21 of the stroboscopic apparatus be controlled by the resistor 31.

In accordance with the provisions of the patent statutes, I have described the principle of operation of my invention, together with apparatus which I now consider to represent the best embodiment thereof, but I desire to have it understood that the apparatus shown and described is only illustrative and that the invention may be practiced by other means.

I claim as my invention:

1. Calibrating apparatus for integrating instruments comprising stroboscopic means for checking the speed of rotation of the instrument upon a predetermined load, an indicating device comprising a wattmeter element and a second element mechanically coupled together and connections between the elements of said device and the circuits of the integrating instrument and the stroboscopic means, whereby the device indicates the degree of accuracy of the instrument.

2. Calibrating apparatus for integrating instruments comprising stroboscopic means for checking the speed of rotation of the instrument upon a predetermined load, an indicating device comprising a wattmeter element and a second element mechanically coupled together and connections between the elements of said device and the circuits of the integrating instrument and the stroboscopic means, whereby the device indicates the degree of accuracy of the instrument and speed-regulating means for the stroboscopic means to compensate for variations in the supply-circuit potential.

3. The method of calibrating electrical instruments of the integrating type which consists in comparing the speed of rotation of the integrating instrument with the rapidity of movement of a second device, regulating the movement of the latter in accordance with variations in the potential applied to the instrument and balancing the torque proportional to the load on the instrument and the rapidity of movement of the second device, respectively, in order to obtain a direct indication of the degree of accuracy of the instrument being tested.

4. In combination, a watthour meter to be calibrated having a rotatable element, means for imposing a load on said watthour meter, a standard of comparison embodying a rotatable element, means for adjusting the standard so that the speed of rotation of its rotatable element bears a definite ratio to the speed of rotation of the watthour meter element for each load imposed, stroboscopic means for comparing the relative speeds of rotation of the rotatable elements, and indicating means actuated in accordance with the speed of the standard element and the load on the watt-hour meter to indicate the error of the latter.

5. In combination, a watthour meter to be calibrated having a rotatable element with evenly spaced marks thereon, means for applying test loads to said meter, a lamp for illuminating the evenly spaced marks, adjustable means for intermittently energizing the lamp at such a rate that said marks appear stationary, and means actuated in accordance with the load imposed on the meter and the frequency at which energizing impulses are applied to the lamp for indicating in terms of per cent registration the error of the meter.

6. In combination, a plurality of electrically operated devices each comprising a movable member, a common source of power for said devices, means for varying the speed of one movable member, means for indicating coincidence in the speeds of said movable members, and means controlled by said first named means for giving a direct indication of variance in the speeds of the movable members.

7. In combination, a plurality of electrically operated devices each comprising a movable member, a common source of power for said devices, means for varying the speed of one movable member, stroboscopic means for indicating coincidence in the speeds of said movable members, and means controlled by said first named means for giving a direct indication of variance in the speeds of the movable members.

8. In combination, a plurality of elements movable in response to a common influence, means for varying the movement of one of said elements, and means responsive to operation of said varying means for giving a direct indication of a difference between the movement of another of said elements and said one element.

9. In combination, a plurality of elements capable of different movements in response to a common influence, one of said elements operating as a standard to move at a given rate in response to a given influence, and means for varying the rate of the standard element to agree with the movement of another of said elements in response to a given influence, and means responsive to operation of said varying means for giving a direct indication of the departure of movement of said other element from the movement of the standard element.

10. In combination, a pair of electrically operated rotatable devices and means for causing the rotation thereof, means for stroboscopically comparing the speeds of said devices, means for varying the speed of rotation of one of said devices, and means controlled by said varying means for giving a direct indication of the amount of variance in the speeds of said devices.

11. In combination, a pair of rotatable devices and means for causing the rotation thereof, means for stroboscopically comparing the speeds of said devices, means for varying the speed of rotation of one of said devices, and means controlled by said varying means for giving a direct indication of the amount of variance in the speeds of said devices.

In testimony whereof, I have hereunto subscribed my name this 18th day of April, 1929.

HARRY P. SPARKES.